March 10, 1936. J. MARTINEZ 2,033,478

SIGN APPARATUS

Filed May 3, 1935 2 Sheets-Sheet 1

INVENTOR,
Jose Martinez,
BY
John Seward.
ATTORNEY.

March 10, 1936.      J. MARTINEZ      2,033,478
SIGN APPARATUS
Filed May 3, 1935      2 Sheets-Sheet 2
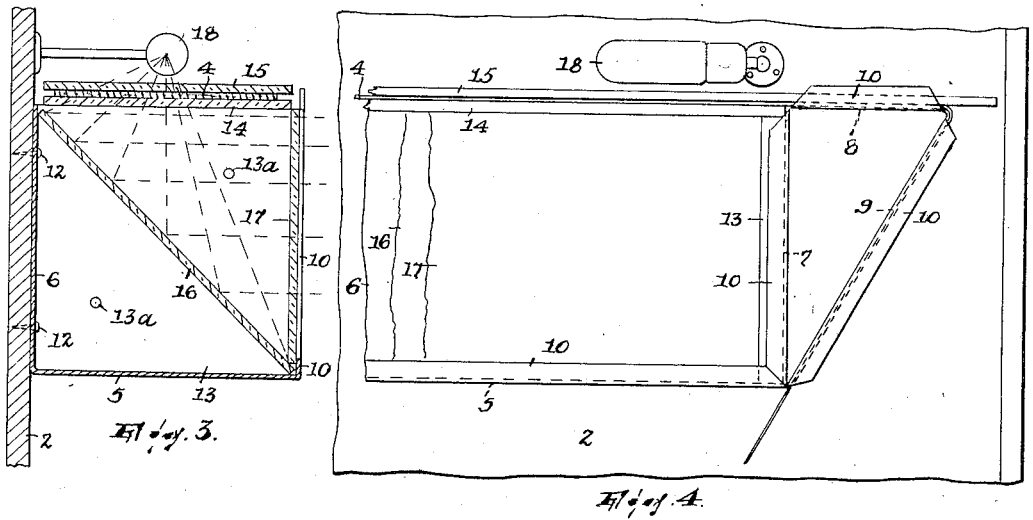
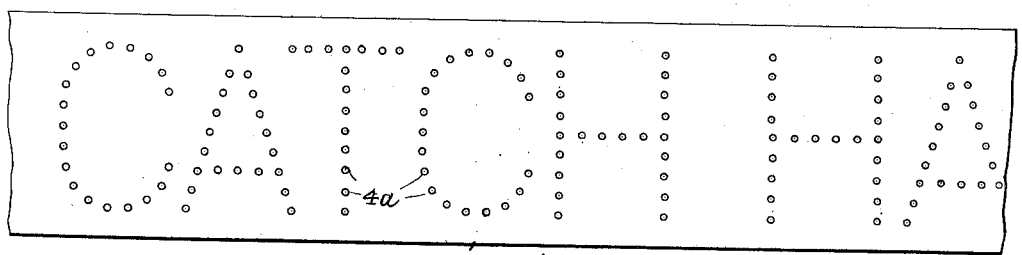
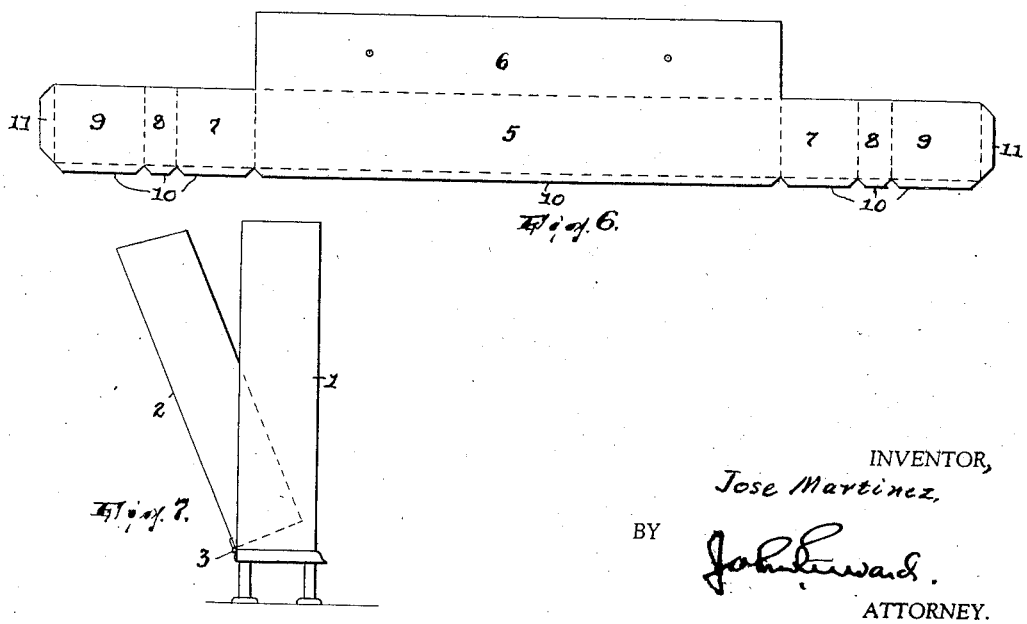
INVENTOR,
Jose Martinez,
BY
ATTORNEY.

Patented Mar. 10, 1936

2,033,478

UNITED STATES PATENT OFFICE 2,033,478

SIGN APPARATUS

Jose Martinez, New York, N. Y., assignor of one-half to J. Handford Brown, Coytesville, N. J.

Application May 3, 1935, Serial No. 19,675

4 Claims. (Cl. 40—32)

This invention relates to sign apparatus, and particularly to that class of such apparatus in which a film adapted to cast a shadow, as by being perforated according to a certain pattern, is interposed between a light source and a mirror arranged at an incline with reference to the film.

One principal object of the invention is to have the film endless and to accommodate a very considerable circuitous extent of film in the comparatively small space of a case in which the various parts of the apparatus are contained, and also to provide for the travel of the film substantially without danger of its catching or becoming twisted or kinked while in motion. Another object is to construct the apparatus so that it can be dispensed to the purchasing public at the least possible expense.

To these ends to an upright structure, as a wall of the case, is secured a strip of sheet metal which has a mid-portion forming a ledge and other and spaced portions upstanding from said ledge and all projecting from said structure; the film is made to bridge said upstanding portions and is preferably held flat between them by two translucent plates between which it extends and travels; a light source is arranged above the plates and below the plates, supported by said ledge and against said structure, is a mirror; and there is means, as a motor-driven roll, to advance the film circuitously. Since the two plates are horizontal and the film is of stiff material, and if space is provided beneath the plates to receive the portion of the film which is not actually subjected to the light, the film may undulate in such space, and this makes it possible to accommodate a very considerable circumferential extent of film in the apparatus, as will appear.

In the drawings:—

Fig. 3 is a fragmentary vertical sectional view between the end walls of the housing formed herein in part by the blank shown in Fig. 6;

Fig. 4 is a fragmentary front elevation of the apparatus;

Fig. 5 is a plan of a fragment of the film;

Fig. 6 is a plan of said blank; and

Fig. 7 is a side elevation of the apparatus, showing the inner shell in partially open position.

Figure 1:
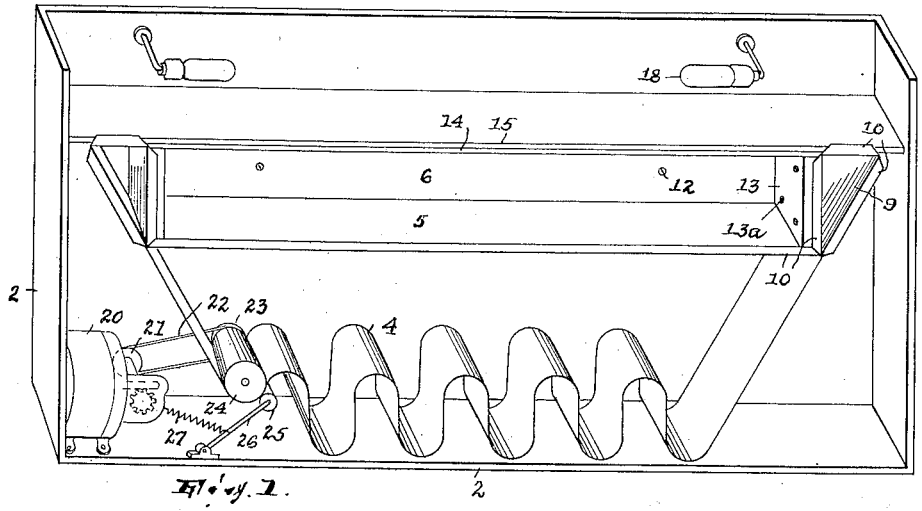
Fig. 1 is a front perspective view of the inner shell of the case, to wit, the one in which the parts (also shown except for the mirror) operative in presenting to the observer the advertising or other matter are mounted.
Figure 2:
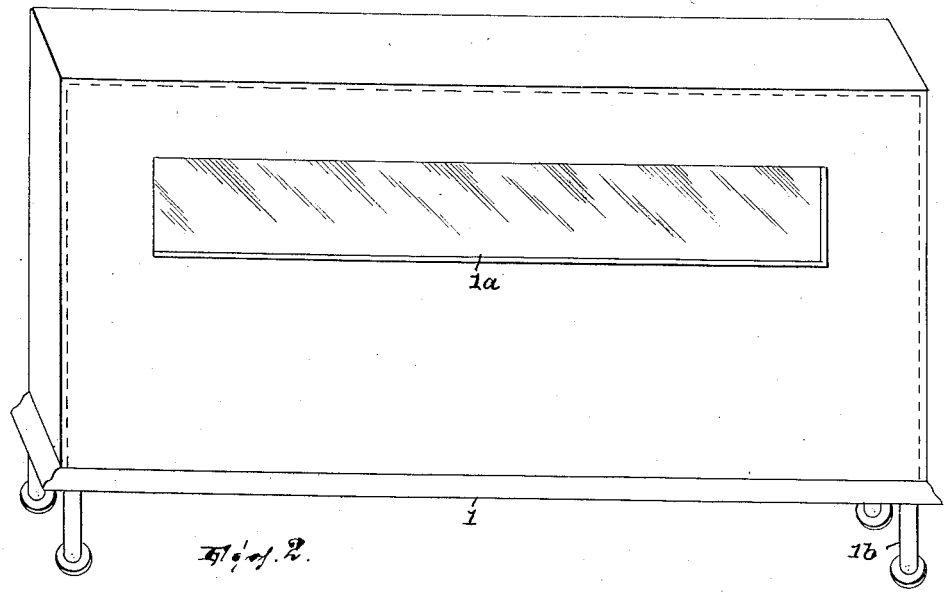
Fig. 2 is a similar view of the outer shell.

The case and the two shells 1 and 2 forming it are rectangular, having limited depth relatively to their vertical and horizontal dimensions. The rear side of shell 1 and the front side of shell 2 are open, shell 2 being of such dimensions as to telescope more or less snugly into shell 1 when entered thereinto from the back. Shell 2 may be hinged to shell 1, as at 3, Fig. 7. Shell 1 has a front vision opening 1a, preferably horizontally elongated. It is desirably supported by feet 1b.

4 is an endless somewhat stiff but flexible, opaque film perforated, as at 4a, in accordance with some pattern, for instance, so as to present words, phrases, or sentences or pictures, arranged in sequence lengthwise of the film. In short it is designed to cast a shadow in accordance with some pattern, here according to the actual perforations shown. The film is to be caused to travel in such manner that its side edges shall be presented substantially horizontally, or toward the front and back of the case, for if that is so then a considerable extent (circumferentially of the film) can be contained in comparatively limited space with the portion thereof at any time not actually in view undulated and supported so as not to catch or otherwise interfere with the travel of the film provided that the portion so in view is arranged to travel and be guided in a horizontal plane above its undulated portion. With this in view the apparatus is further constructed as follows:

In Fig. 6 is shown an elongated sheet metal blank comprising an elongated central portion 5, an elongated portion 6 flanking portion 5 at one of its long sides, and extensions each comprising in outward succession the portions 7, 8 and 9. The portion 6 is to be bent preferably upwardly at right angles to portion 5, so that portions 6 and 5 respectively form a back wall and a ledge. Each portion 7 is to be bent up to form an end wall. Each portion 8 is to be bent outwardly and horizontally to form an extending table and each portion 9 bent downwardly and inwardly to afford support for such table. At the side opposite the portion 6 the blank has, in coincidence with the respective portions 5, 7, 8 and 9, projecting flanges 10, and there are also preferably end flanges 11. The flange of portion 5 is to be bent upwardly; those of portions 7 inwardly; those of portions 8 upwardly; those of portions 9 outwardly; and those, 11, at the ends are to be bent inwardly and soldered or otherwise secured to the bottom wall 5.

The structure thus formed from this blank is secured with its back wall face to face with the back wall of shell 2 in any way, as by screws or nails 12. Blocks 13 or equivalent rests are then arranged inward of and secured against its end walls 7, as at 13a. A support is thus formed, comprising an upright structure (formed by the back wall of shell 2 and wall 6, Fig. 3), a ledge and two spaced sides, each comprising the parts 7—13, and by this are supported certain elements, including the part of the film which at any time may be in view. Thus:

Resting on the blocks 13 is a translucent, or clear, glass plate 14 over which the film travels. Upon the film, and coacting with plate 14 to maintain flat the portion of the film between them, is a translucent, preferably ground, glass plate 15, which may desirably extend over the guideways 8. Resting with its top edge against the back wall 6 and its bottom edge against the flange 10 of the bottom wall 5, and hence at about forty-five degrees from the horizontal, is a mirror 16 whose length is equal to that of wall 5. There may be also a clear glass plate 17 arranged in a vertical plane forward of the mirror and between the blocks 13 and the flanges 10 of the walls 7.

The entire assembly including the mentioned support, the glass plates and the mirror affords a very simple and inexpensive one for the display contemplated and the proper guiding of the film, which is not only held flat between the plates 14 and 15 but is confined to a definite path (both in transit between the plates and where it approaches and departs from them) between the back wall of shell 2 and the flanges 10 of the portions 8 and 9.

Above such assembly is a light source, as a pair of electric lamps 18.

Below the assembly is a means for driving the film, as an electric motor 20 secured in the shell 2 and driving a pulley 21 which in turn through a belt 22 drives the pulley 23 of a roller 24 around which the film extends, 25 being a roller which is caused to hold the film pressed against the roller 24 by its supporting member 26, pivoted in shell 2, being subjected to the tension of a spring 27.

When the motor is operating it draws the film from the left in Fig. 1, and since the portion of the film in view is held flat by the plates so much of the film as is between the film-advancing means and the right-hand ends of the plates may accumulate, as shown, in undulations. The construction is such that a very considerable circuitous extent of film may be accommodated in the apparatus and undergo travel indefinitely without kinking or otherwise undergoing conditions which may interfere with its travel.

It will be understood that the mentioned support is so positioned that the image which appears in the mirror incident to the light passing through the perforations in the film is visualized through the opening 1a of shell 1.

Having thus fully described my invention what I claim is:

1. In combination, an upright structure, a support including a ledge secured to said structure and two spaced walls upstanding from the ledge and all projecting from said structure, a translucent plate bridging and resting directly on the walls, an elongated flexible film resting on the plate and being movable lengthwise of itself and adapted to cast a shadow according to a selected pattern, an inclined mirror supported upon the ledge and against said structure in position to receive the shadow, and a light source above the plate.

2. In combination, an upright structure, a sheet metal element secured thereto and bent to form a horizontal ledge and two spaced walls upstanding from the ledge, said ledge having the edge thereof remote from said structure bent upward, an elongated film bridging and movable lengthwise of itself over said walls and adapted to cast a shadow according to a selected pattern, an inclined mirror supported by the ledge and abutting the bent-up edge thereof and said structure, and a light source above the film.

3. In combination, an upright structure, a sheet metal element secured thereto and bent to form a horizontal ledge and two spaced walls upstanding from the ledge and two tables projecting outwardly from the upper ends of the walls, said ledge and tables having the edges thereof remote from said structure bent upward, an elongated film bridging and movable lengthwise of itself over said walls and extending over the tables between their bent up edges and said structure and adapted to cast a shadow according to a selected pattern, an inclined mirror supported by the ledge and abutting the bent-up edge thereof and said structure, and a light source above the film.

4. In combination, an upright structure, a box-like housing open at the top and comprising a bottom-forming ledge and two spaced sides upstanding from the ledge and all projecting from said structure, a pair of translucent plates bridging and resting directly on said sides, an elongated flexible film extending and movable lengthwise of itself between the plates, an inclined mirror supported by said ledge and structure, and a light source above the plates.

JOSE MARTINEZ.